Aug. 14, 1962        E. V. PAINTER ETAL        3,049,000
APPARATUS FOR DETERMINING THE SEDIMENT IN COLD MILK
Filed June 6, 1960                                6 Sheets-Sheet 3
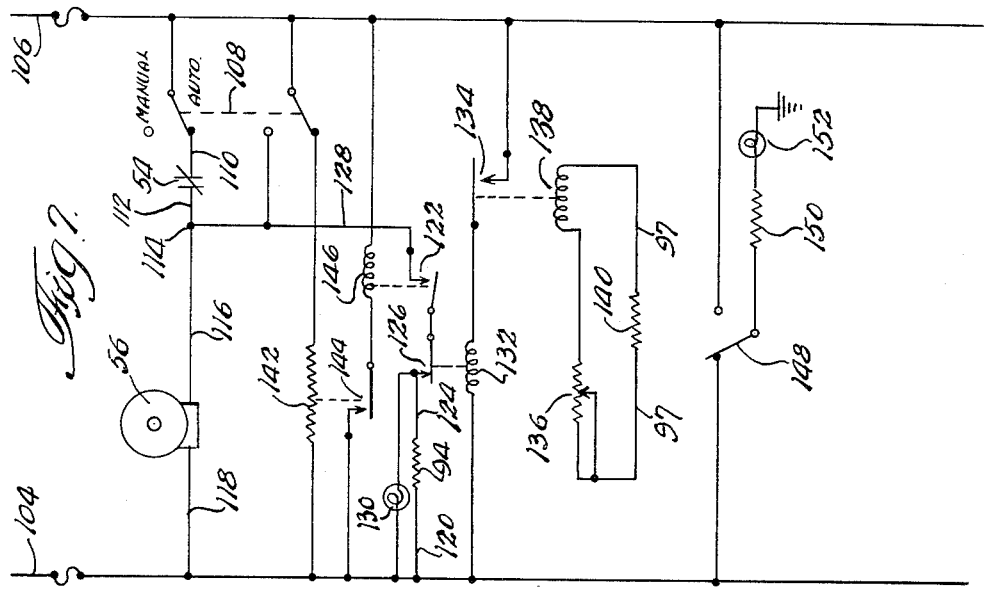
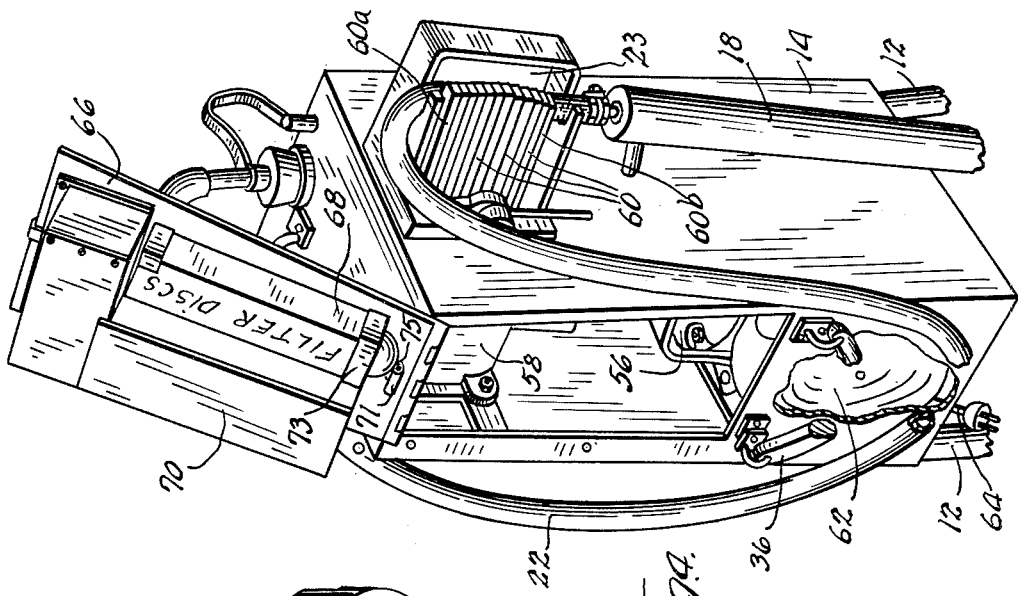
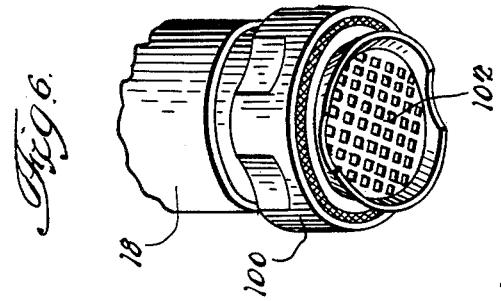
INVENTORS.
Erle V. Painter
BY & Robert C. Shepherd
Olson, Mecklenburger, von Holst,
Pendleton & Neuman
ATTYS.

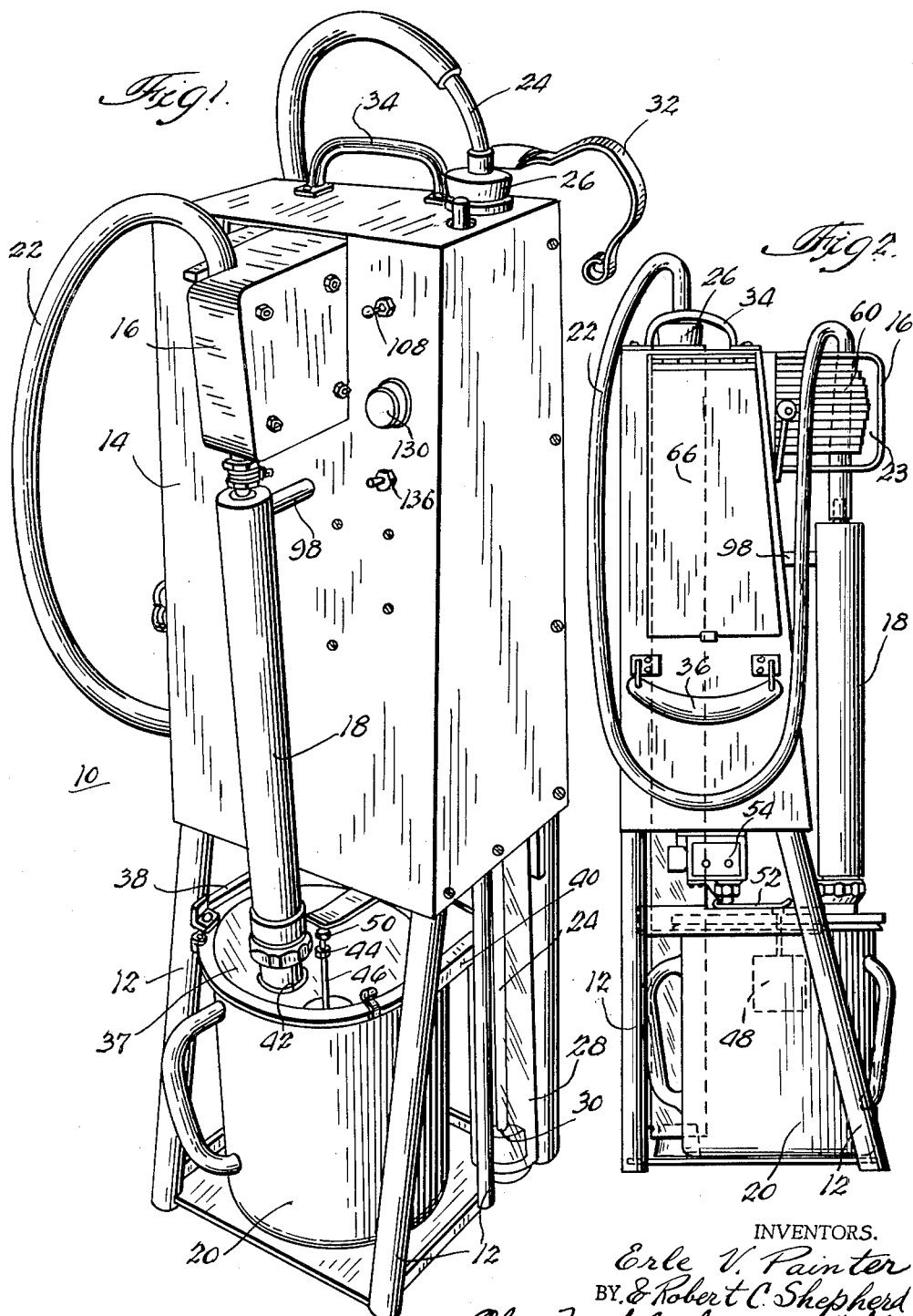

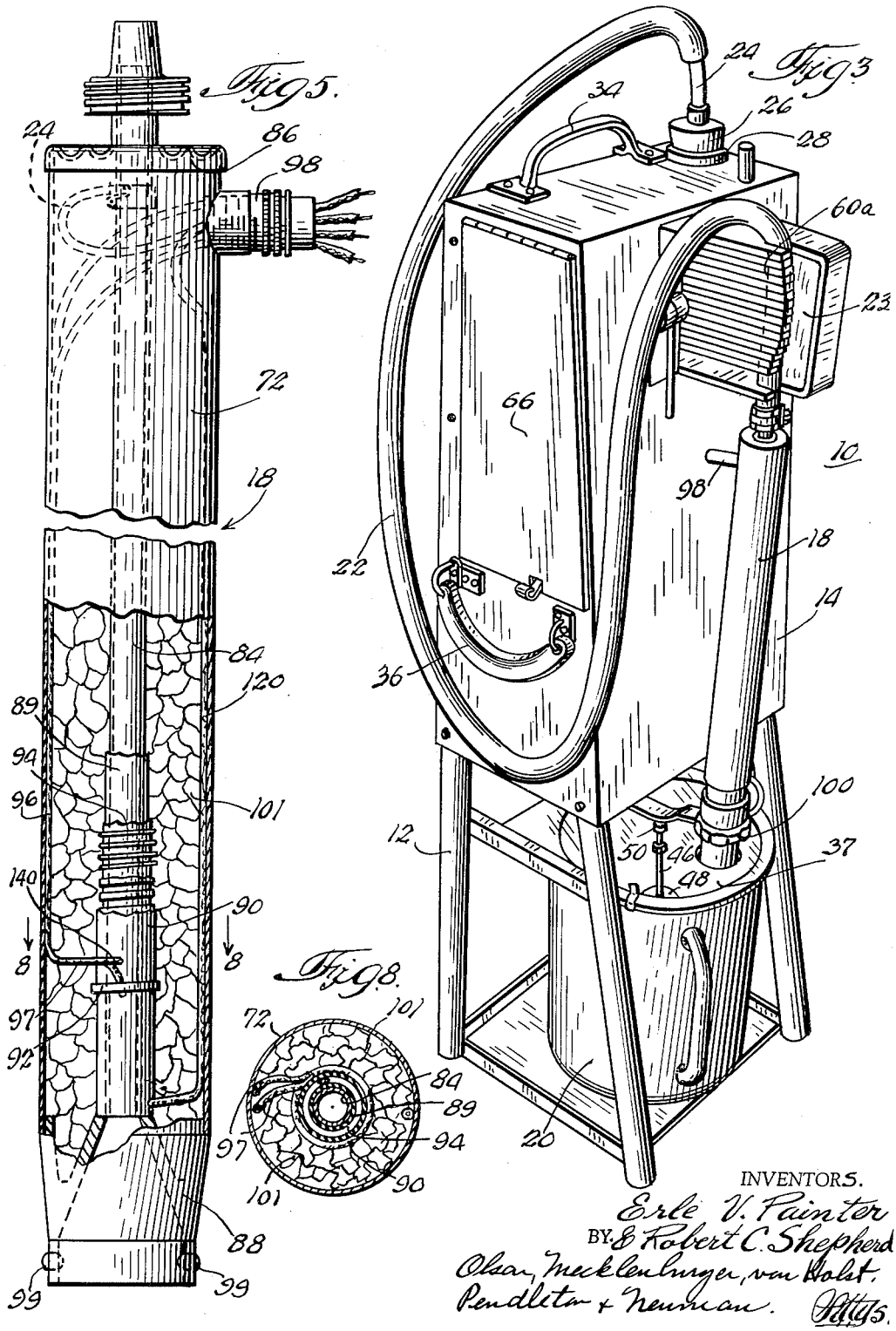

Aug. 14, 1962     E. V. PAINTER ETAL     3,049,000
APPARATUS FOR DETERMINING THE SEDIMENT IN COLD MILK
Filed June 6, 1960     6 Sheets-Sheet 4
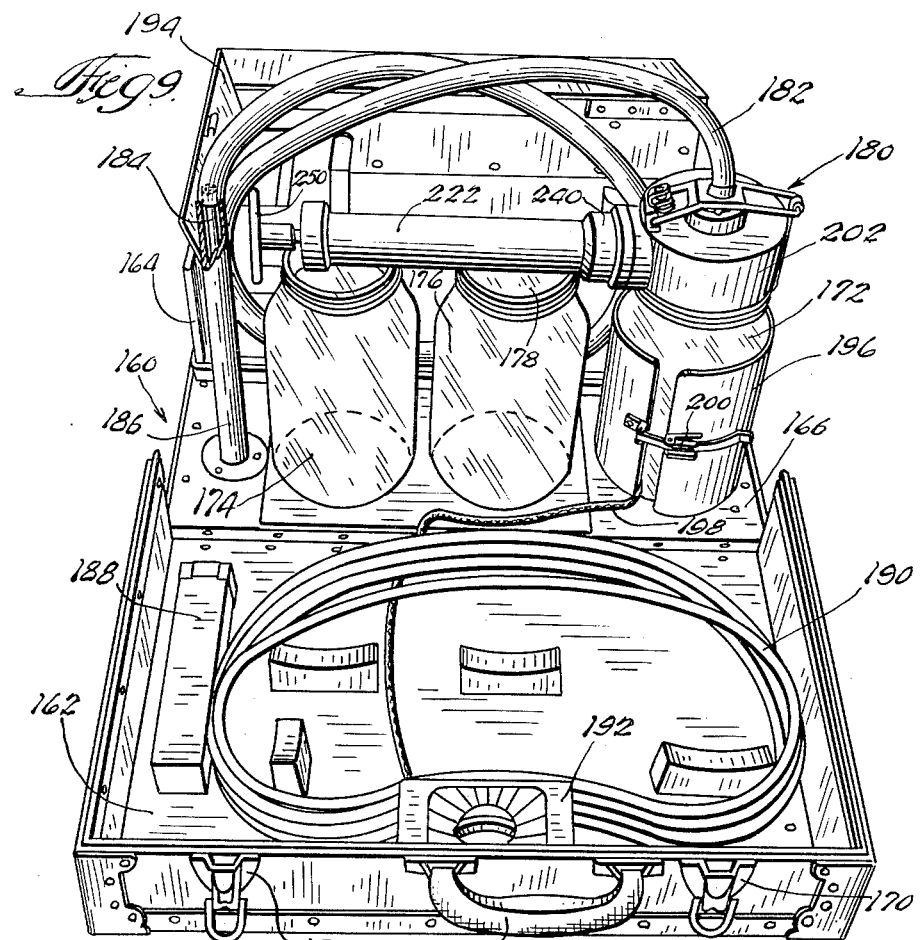
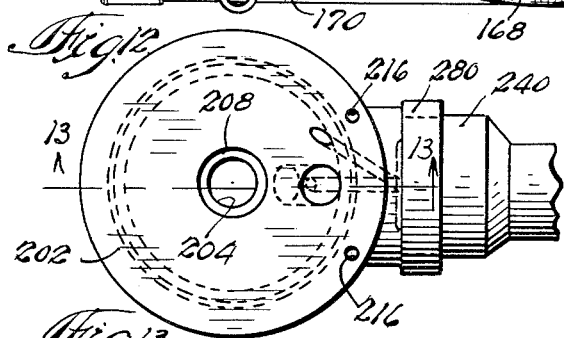
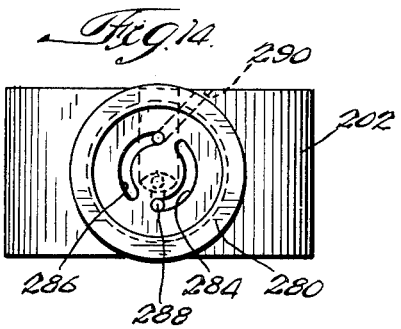
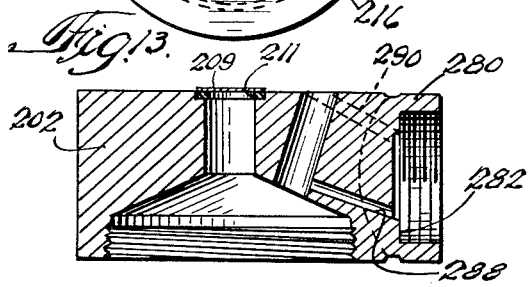
INVENTORS
Erle V. Painter &
BY Robert C. Shepherd
Olsen, Mecklenburger, von Holst,
Pendleton & Neuman
Attys.

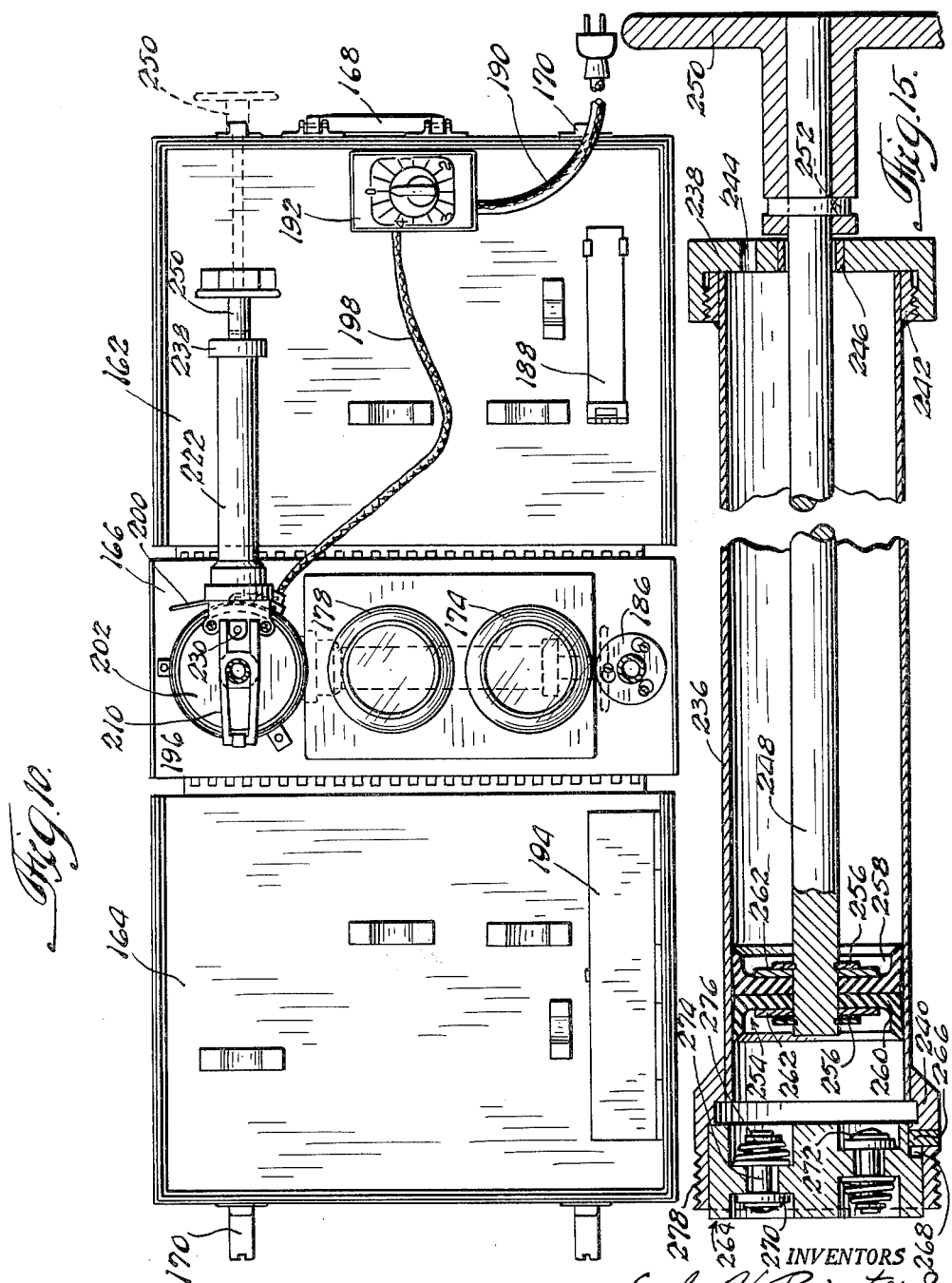

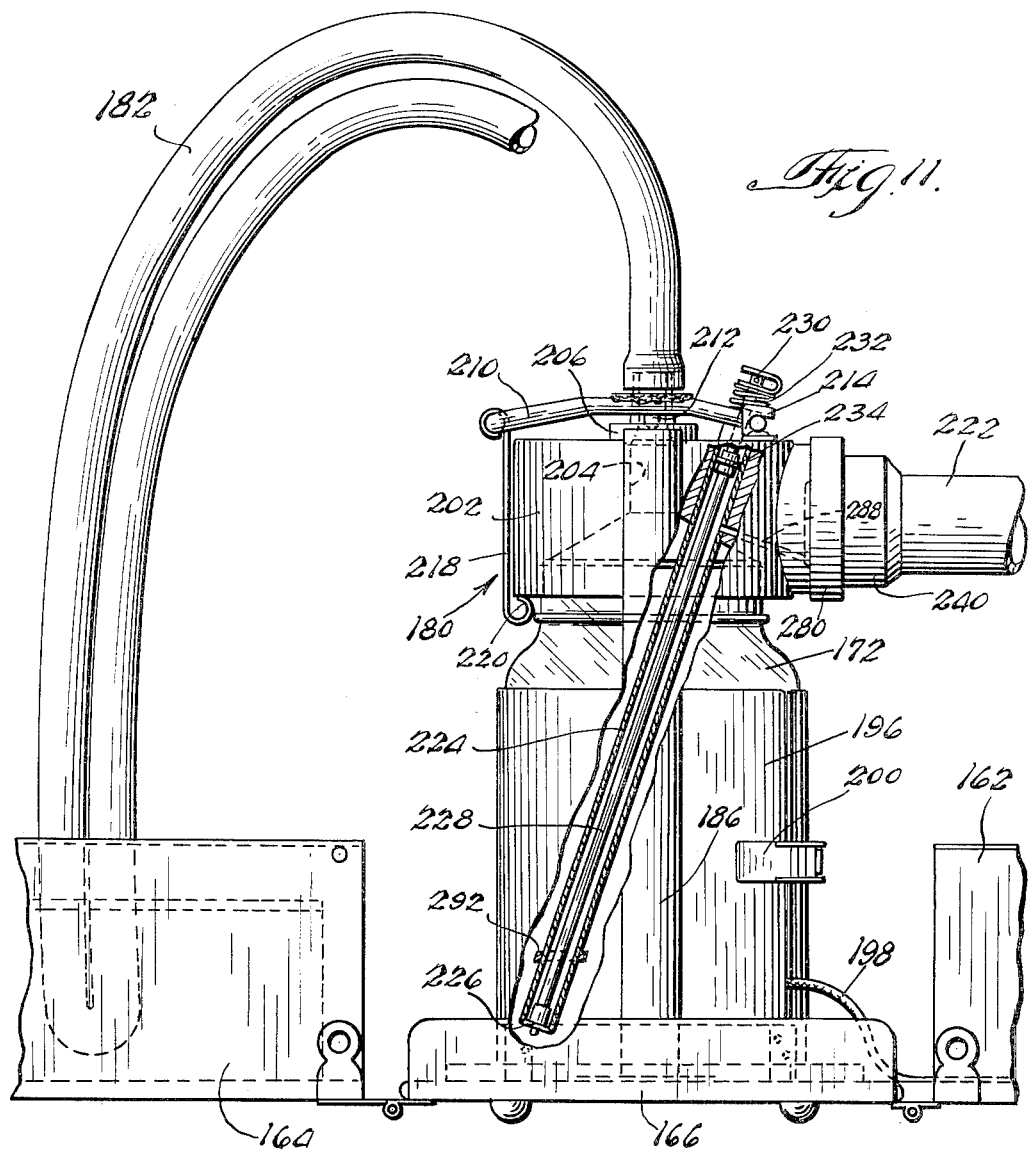

United States Patent Office 3,049,000
Patented Aug. 14, 1962

3,049,000
APPARATUS FOR DETERMINING THE
SEDIMENT IN COLD MILK
Erle V. Painter, La Grange, and Robert C. Shepherd,
Oak Lawn, Ill., assignors to Johnson & Johnson, a corporation of New Jersey
Filed June 6, 1960, Ser. No. 34,335
20 Claims. (Cl. 73—61)

This invention relates to improved apparatus for determining the amount of sediment in milk and more particularly to improved apparatus for performing sediment tests on milk which has been refrigerated. This application is a continuation-in-part of our copending application Serial No. 708,485 (now abandoned) which was filed on January 13, 1958.

It has been the practice in recent years to perform, among other tests, a test on fresh milk to determine the sediment content thereof. In some states such tests are required by law. In general, such tests are found to be an accurate indication of the conditions surrounding milk production. The presence of excessive sediment in the milk will generally indicate unsatisfactory conditions of the barn and farm area, milking equipment and cows involved.

Heretofore it has been the practice to store milk at the farm in ten-gallon cans which are picked up daily by a truck driver. At the time of collection the dairy will take a one-pint measured sample from the bottom of each ten-gallon milk can and pass the sample through a fiber filter of predetermined standard pore diameter. The can which is tested must have settled for at least one hour before this off-the-bottom test is performed in order to insure standardized results. The operator then compares the filter disk with known predetermined standards and based upon the amount of foreign material on the test disk, the quality of the milk, and the conditions under which the milk has been produced are determined with reasonable accuracy.

A new development in milk production provides large farm tanks in which the farmer stores milk, sometimes for several days, between truck pickups. These tanks are refrigerated to maintain the milk at a temperature in the range of 32 to 40° F. and provide means for agitating the milk each time the refrigerating system is actuated to avoid temperature differentials in the milk. Thus conventional sampling techniques are of little value with the farm tank system of collection in that any milk sample could be an agitated sample rather than a settled off-the-bottom sample. Furthermore, the bottom configuration and the ratio of the bottom area to the total volume of milk varies considerably from tank to tank and none might correspond to the configuration of a ten-gallon milk can. It has been found, however, through extensive tests that the sediment deposit in a test using an agitated sample will produce a filter coloration one-eighth the amount experienced with conventional off-the-bottom samples provided all other factors are maintained constant. Thus, where it has been the custom heretofore to use a one-pint off-the-bottom sample passed through a white Lintine filter 1.25" in diameter, the same results in degree of coloration may be produced with a one-gallon sample of agitated milk passed through the same filter or a proportionately reduced volume passed through a filter of proportionately smaller area. Thereby the conventional standards may be employed.

It has further developed that where a one-gallon sample is employed and that sample is agitated refrigerated milk, the refrigerated butterfat will clog the interstices in the filter, thus preventing or greatly impeding passage of a full gallon therethrough. It has been found that increasing the milk temperature to a degree where it will readily flow through the filter disk will require an inordinate amount of energy and time, will induce rancidity in the milk, or, conversely, the employment of sufficient pressure to perform the test on cold milk will require an inordinate amount of equipment and approach the limits of mechanical strength of the filter.

It is therefore one object of this invention to provide improved apparatus for rapidly testing the condition of refrigerated milk.

It is a further object of this invention to provide apparatus which will withdraw a measured sample of milk from a large vessel and rapidly heat the milk before passing the milk through a standard test filter.

It is still a further object of this invention to provide improved apparatus which is relatively portable while capable of rapidly heating and testing a large milk sample for sediment content.

It is another object of this invention to provide an improved sediment tester which will not induce inordinate bacterial growth or rancidity in the milk.

Another object is the provision of an isolated milk path from the time the milk is removed from the storage vessel until a sediment test is completed.

It is still another object of this invention to provide improved compact, portable apparatus capable of withdrawing a measured amount of milk from a large vessel rapidly and under substantial predetermined pressure and heating the volume of milk to produce a predetermined moderate temperature rise before forcing the heated milk through a standard filter.

Further and additional objects of this invention will appear from the following description, the appended claims and the accompanying drawings.

In one form of this invention an elongate vertical frame supports a pump, heating element and milk receptacle with a flexible milk conduit terminating in a rigid conduit extending from the pump input. The above elements define a continuous sealed sanitary fluid path between the free end of the rigid conduit and the receptacle. The pump is capable of passing a predetermined volume of fluid under preselected pressure and the heater is designed to raise that predetermined volume by a particular temperature increment all by semi-automatic means.

For a more complete understanding of the invention reference will now be made to the accompanying drawings wherein:

FIG. 1 is a perspective view of a preferred embodiment of the invention;

FIG. 2 is a side elevational view of the embodiment of FIG. 1;

FIG. 3 is an alternate perspective view of the embodiment of FIG. 1;

FIG. 4 is a fragmentary perspective view of the embodiment of FIG. 1;

FIG. 5 illustrates, partially in section, the heating element of the preferred embodiment;

FIG. 6 is a fragmentary view of the filter holder;

FIG. 7 is a schematic circuit diagram of the components of the preferred embodiment;

FIG. 8 is a cross-sectional view of the heating element of FIG. 5;

FIG. 9 is a perspective view of a second embodiment of this invention with the case opened;

FIG. 10 is a plan view of the embodiment of FIG. 9;

FIG. 11 illustrates the pump and heater mechanism of the embodiment of FIG. 9;

FIG. 12 is a top plan view of the pump and valve housing;

FIG. 13 is a cross-sectional view taken on the line 13—13 of FIG. 12;

FIG. 14 is an end view of a portion of the valve; and

FIG. 15 illustrates, in section, the pump and valve mechanism.

Referring now to the drawings and more particularly to FIGS. 1, 2 and 3, the sediment tester 10 is a light weight portable device which stands vertically on a frame including four leg members 12 and has a housing 14 surrounding the upper portion thereof. A pump is enclosed within the housing 14, a finger portion 16 thereof extending outwardly through an aperture in the housing. Disposed immediately beneath the finger portion 16 is a heating element 18 extending vertically to a point immediately above a receptacle 20.

In the described embodiment the receptacle 20 has a one-gallon capacity in accordance with the discussion presented above. A flexible plastic tube or conduit 22 extends upwardly from the cylindrical heating element 18 through the finger portion 16 and terminates in a rigid conduit 24. As illustrated in the various figures, the rigid conduit 24 has a resilient annular plug 26 disposed near the end thereof and extends downwardly from the plug 26 through a sheath 28. This is a manner in which the conduit 24 is normally stored when not in use. The sheath 28 may be filled with an appropriate bactericide.

When a test is being performed, the rigid conduit 24 is withdrawn from the sheath 28 and inserted into a bulk milk tank so that the free end 30 of the conduit 24 will be disposed at a point in the central area of the tank. The rigid conduit 24 may be extended from the tester 10, the degree of extension being limited only by the length of flexible conduit 22. A hanger 32 of any appropriate shape may be disposed on the rigid conduit 24 to support the conduit in the tank while a test is being performed. Handles 34 and 36 are provided on the tester to aid a truck driver or other operator in transporting and handling the tester.

The receptacle 20 slides into position beneath the heater 18 and is supported in position with a transparent plastic cover 37 by a pair of U-shaped channels 38 and 40. The cover 37 has an offset aperture 42 which is aligned with the outlet of the fluid path and also has a small central aperture 44 through which a switch actuating arm 46 passes. The arm 46 carries a float 48 at the lower end thereof and a switch button 50 at the upper end thereof. The button 50 engages a switch blade 52 whenever the fluid level in receptacle 20 rises sufficiently to raise the float 48. Switch blade 52 actuates an enclosed switch 54 in a conventional manner to open the pump circuit and terminate a testing cycle. This will occur whenever one gallon has been passed through the filter and collected in the receptacle. In the alternative, it is well recognized that one may desire to immediately return the test sample to the farm tank in which event the receptacle 20 may be omitted and a meter switch be substituted for the float switch.

The pump is of a conventional type. As shown in FIG. 4 a motor 56 and gear box 58 are disposed within housing 14 and are connected to the plurality of outwardly extending fingers 60. The fingers are pivotally mounted and cam actuated whereby the fingers sequentially compress the flexible tubing 22 against a rubber backing 23, forcing a measured quantity of fluid downwardly through the tubing. Starting with the uppermost finger 60a, each finger is successively moved against the tubing to form a seal until the lowermost finger 60b has formed a seal with the tubing, at which time the uppermost finger 60a also forms a seal to define a small fluid chamber within the tubing. Such a pump has the advantages of simplicity, easy maintenance, long life and absolute sanitation. However, it should be understood that other pumping means may be substituted therefor.

In the first preferred embodiment, as best illustrated in FIG. 4, a spring loaded reel 62 carrying a line cord 64 is provided for ease of operation and connection into conventional public services. The housing 14 is also provided with a hinged door 66 on the inside of which a filter disk container 68 and storage container 70 are secured.

In the first preferred embodiment the standard 1.25" diameter Lintine disks are employed and are disposed in a filter disk box 68. The upper end of the filter box 68, which becomes the lower end when the door is raised to the position of FIG. 4, is removed and retained in a support 73 having a portion 75 hinged at a point overlying the column of disks so that when open, as shown in FIG. 4, the disks fan out under their own weight to form an automatic dispenser. The support portion 75 has a turned portion 71 which will maintain the filter box 68 closed when in engagement with the support 73. The container 70 is adapted to receive records and writing implements necessary in the utilization of the described testing apparatus and is open on one side for that purpose.

The details of the heating element are shown in FIG. 5. To adequately perform the testing operation on a practical basis it is necessary that the milk pass through the test filter at a rapid rate and that the test equipment be easy to operate. In the conventional farm bulk tank the milk temperature is maintained at a temperature of 40° F. or less. It has been found that at this temperature milk will not pass through the standard filter without producing progressive blocking of the interstices with butterfat. It has been found that by combining pressures in the order of twenty to thirty pounds per square inch at a temperature approximately 10° above the storage temperature, it is possible to rapidly force a one-gallon sample of milk through a 1.25" filter disk. It has also been found that reduced pressures can be employed with somewhat elevated temperatures within a limited range. It has been found that no detrimental effects are observable upon the milk if it is elevated in temperature up to about 70° F. for a short period of time. Subsequent refrigeration appears to prevent any substantially accelerated bacterial growth or rancidity. When milk is even momentarily heated above about 70° F. rancidity is frequently produced and the action which produces rancidity appears to continue even though the milk is subsequently refrigerated.

In one embodiment of this invention this test can be accomplished in a time interval between one and three minutes. To provide the necessary rapid heating of passing milk the heater 18 has a thermal output of approximately 800 watts. The heater comprises an outer stainless steel jacket 72 and an inner stainless steel cylindrical core 84 connected to form a hollow enclosure by a pair of stainless steel end members 86 and 88.

A coating of high temperature electrically insulating resin 89 is applied to core 84 over which a helix of heater wire 94 is formed. Wire 94 is preferably of nichrome and approximately 90 turns are found to provide the appropriate resistance for a dissipation in the order of 800 watts. An additional layer of resin 90 is formed over the heater 94.

A thermocouple 140 is secured to the assembly described above by a tying of glass braid 92 having an additional layer of resin applied thereto. The thermocouple 140 has a cold junction removed from the heating element as far as practicable, and is connected through conductors 96 and 97 into the circuit as illustrated in FIG. 7. While a single thermocouple is illustrated here for simplicity, it is preferred that a plurality of thermocouples be provided in series to improve the sensitivity and reliability of the control.

Heating element 94 is connected into the circuit of FIG. 7 through conductors 120 and 124. All of the conductors 96, 97, 120 and 124 pass through a connector 98 into the main housing 14.

The filter holder 100 threadedly engages the two pins 99 at the lower end of heater 18 and the upper end may be threaded or clamped in sealed engagement with the output of pump 16. A thermally insulating filler 101, such as asbestos wicking, is preferably utilized to fill any remaining space within outer cylinder 72 but outside of the heater.

The fragmentary illustration of FIG. 6 shows the lowermost end of heater 18 and the filter holder 100 which is threadedly secured thereto. The filter holder 100 has a large mesh transverse screen 102 through which the milk passes and above which the Lintine filter disk is supported. Thus, at the time a test is made the filter device 100 is removed from the heater 18 and a clean disk placed therein over the screen 102. The device 100 is then replaced and a measured quantity of milk pumped therethrough. Thereafter the device 100 is again removed and a comparison made between the test disk and a collection of disk standards provided for that purpose. The quality of the milk is thus determined.

Referring now to FIG. 7, the circuit of the tester 10 will be described briefly. Main lines 104 and 106 will normally extend from the power cord 64 to within the housing 14. The line 106 is connected to the fixed poles of a double throw center-off manual switch 108. When the switch 108 is thrown to the lower position in FIG. 7, the system operates automatically as already described above. Thus the circuit is completed from line 106 through switch 108, line 110, float switch 54, and line 112 to terminal 114 and the electrical components connected thereto. These components include pump motor 56 which is connected from terminal 114 through conductors 116 and 118 to line 104. Heater 18, which includes heating elements 94, is connected at one end to line 104 through conductor 120. The other terminal of heater 94 is connected through conductor 124 to normally closed relay contacts 126 which are in turn connected through normally open relay contacts 122 and conductor 128 to terminal 114. Connected in parallel with heater 94 between conductor 104 and contacts 126 is a heater pilot lamp 130 which indicates heater cycling.

A relay coil 132 which actuates contacts 126 is connected in series with normally open contacts 134. Contacts 134 are controlled by a coil 138 which is sensitive to extremely small currents. Coil 138 is in series with a 50 ohm rheostat 136 and the copper-constantan thermocouple 140. As is well known, when the temperature of such as thermocouple junction is heated, it generates a voltage. This voltage provides a current in coil 138 which closes contacts 134. This opens the heater circuit through normally closed contacts 126 to produce automatic temperature control. Control of the actual temperature level is provided by rheostat 136. Rheostat 136 is adjustable from the outside of the housing 14, and relays 132 and 138 may be adjacent thereto behind the housing panel.

A thermal time-delay device including a heater 142 and contacts 144 is provided to delay heater operation upon initiation of a measuring cycle. Contacts 144 energize relay coil 146 which, in turn, closes contacts 122 in the heater circuit. Thus, the initial flow of milk is cold and insures flushing and apparatus filling prior to the application of heat. Thus the burning of small residual amounts of milk is avoided.

A double throw switch 148, a large resistor 150 and a pilot lamp 152 are provided to indicate the ground polarity. If the light 152 is illuminated when the switch 148 is in the position shown, this would indicate that the line 106 is grounded, if, conversely, the light 152 glows when the switch 148 is in the alternate position, the line 104 is ground. The tester frame should be grounded to avoid a shock hazard to the operator. To check for a good ground, the operator shifts the switch 148 and the light 152 should glow brightly in one position and be dark in the other. During subsequent use of the tester the ground test switch 148 is left in the position when the light 152 is not energized.

When double pole switch 108 is thrown to the upper position as shown in FIG. 7 the float switch is bypassed and the pump motor 56 is energized through conductor 128. Thus the pump may be operated independently in the event the disclosed apparatus is used with alternate measuring means or for any other purpose of the operator.

A second embodiment of this invention is disclosed in FIGS. 9–15. In this embodiment a somewhat smaller sample is employed and a somewhat smaller filter area coordinated therewith so that the coloration of the filter bears the same relationship to the degree of sediment deposit or contamination as the previously described embodiment. As already set forth, this conforms the data to the prior art technique of sampling warm milk by taking a one-pint sample from stagnant cans in an off-the-bottom test. In the embodiment of FIGS. 9–15 a three-pint sample of cold milk is withdrawn from the storage vessel, heated and passed through a filter having a diameter of $11/16''$. In employing this embodiment for the test purposes described herein it has been found that somewhat increased temperatures with reduced pressures produce optimum results. Thus a temperature rise to about 70° F. has been found to produce optimum testing without detrimental effect upon the milk sample. When heated to a temperature of about 70° F. somewhat reduced pressures in the order of 10 p.s.i. have been found adequate.

As shown in FIGS. 9 and 10 this embodiment of the invention is a highly portable unit contained in a hinged case 160 having two side portions 162 and 164 hinged to a base 166. The case is shown open in FIG. 9 but when closed has very much the same appearance as an overnight case with a top handle 168 and two latches 170. Contained within the case 160 are three two-quart jars 172, 174 and 176. Only one of these jars is directly employed as a part of the testing apparatus, in this instance jar 172. Jar 176 has a sealed cover 178 and contains a sterilizing solution for the various components. Jar 174 is a spare. A pump, valve, and filter holder assembly 180 is secured to the test jar or heating chamber 172 and a flexible plastic tube 182 extends from the assembly 180, terminating in a rigid probe 184. As in the first embodiment, the rigid probe 184 is inserted in the bulk tank to obtain a measured sample from a controlled area within the bulk tank and the flexible tube 182 provides a continuous isolated milk path from the vessel so that the milk is at all times isolated from the atmosphere and exposure to contamination is avoided. The rigid probe 184 is stored within a scabbard 186 secured vertically to the base 166. Also forming a part of the case 160 are a package of filters 188, an electric extension cord 190, a clock timer 192 and a small receptacle 194 for data cards, marking implements, labels and the like.

Secured to the base 166 is a flexible heating blanket 196 having a stainless steel shell, an insulating liner, and a matrix of heating wires imbedded in the insulating liner. A two-conductor electric cable 198 extends from the blanket to the timer 192 which is in turn connected to the extension cord 190. A conventional latch 200 is provided on the heating blanket 196 to hold the blanket firmly against the bottle 172 insuring optimum heat transfer. It has been found that a simple heater having a capacity of 1000 watts is sufficient to raise the temperature of a three-pint sample to about 70° F. in three minutes where the sample is initially in the range of 32 to 40° F. The timer is calibrated to obtain the desired heating cycle within a range up to five minutes. The pump, valve, and filter holder will now be described in greater detail and reference should be made to FIGS. 11–14.

The assembly 180 is disposed in a housing 202 preferably formed of molded and machined plastic. The housing 202 is threaded onto the jar 172 and has a central aperture 204 adapted to receive a filter holding cap 206 thereover. As shown in FIGS. 12 and 13 a small shoulder 208 is provided on the housing 202 to receive a Lintine sediment test disk 209 on a small sealing ring 211. The disk is sealed in place by holder 206. An intimate seal is insured by a clamping yoke 210 which has pins 212 which engage corresponding recesses in the holder 206. Yoke 210 is hinged in a pair of supports 214 secured by appropriate screws in apertures 216 formed in housing 202. A spring latch 218 extends downwardly from yoke 210 and has a curved portion 220 which engages the bottom surface of housing 202.

A unique valve arrangement is provided in this invention so that a single pump 222 shown in FIG. 15 can be employed both for filling the jar 172 with milk and subsequently emptying it. A tube 224 is mounted in housing 202 and extends to a point adjacent the bottom of jar 172. A small conical valve 226 is disposed at the bottom end of tube 224 and is actuated by a push rod 228 extending upwardly through the housing 202 and terminating in a manual button 230. A spring 232 is compressed between button 230 and tube 224 whereby the conical valve 226 normally closes the end of tube 224. Valve 226 is opened by manually depressing button 230. An annular gland 234 is secured to rod 228 near its upper end to form a seal in the tube 224.

It is well to note at this point in the description that the device is operated in an inverted position whereby the valve 226 is effectively disposed at the top of the receptacle 172 when the receptacle is being charged with milk and emptied. During the heating cycle the jar 172 is in the position illustrated and the valve 226 is closed whereby contamination of the internal pump mechanism is completed avoided.

The pump is illustrated in FIG. 15 and includes a cylindrical housing 236 having an end cap 238 and a forward valve shell 240. The end cap 238 is threaded to sleeve 242 which is welded to cylinder 236 and the end cap is provided with a vent hole 244. A packing tube 246 is disposed in a central aperture in the end cap 238 to prevent contamination of the cylinder 236 and to provide a guide and bearing for piston shaft 248. A handle 250 is secured to the external end of shaft 248 by a lock screw 252 and at the internal end of rod 248 a double-acting piston 254 is secured between two snap rings 256. The double acting piston 254 consists of conventional piston seals 258 and 260 having oppositely extending cylindrical walls engaging the wall of cylinder 236. Washers 262 are provided to maintain the piston seals 258 and 260 in their proper relationship. The seals 258 and 260 may be made of any conventional flexible material such as leather.

A separate removable valve assembly 264 is inserted within the forward shell 240 and is keyed to provide positive orientation. A key portion 266 in the shell 240 fits within a keyway 268 in the valve assembly 264. The valve assembly has two check valves 270 and 272 oppositely oriented so that on the compression stroke valve 270 is open and 272 sealed, while on the evacuating stroke of piston rod 248, valve 272 is opened while valve 270 is positively closed. Each valve is supported on a headed shaft 274 and springs 276 under compression continuously urge both valves 270 and 272 to their respective closed positions. The valve shell 240 has a threaded portion 278 which engages a transverse portion 280 of the cover assembly 202. As best illustrated in FIGS. 13 and 14, the inner face 282 has two semicircular ports 284 and 286 which communicate with passageways 288 and 290. Passageway 288, as clearly shown in FIG. 11, provides air communication between the tube 224 and the pump while passageway 290 vents the pump to the atmosphere. By turning the pump 222 through one-quarter of one revolution or less with respect to the valve assembly, it is possible to change from a compression phase to an evacuation phase. Thus when valve 272 is aligned with passageway 288 or the associated semicircular recess 284 air will be evacuated from the jar 172 creating a subatmospheric pressure and milk will be drawn upwardly through flexible tube 182 until the jar is filled to the proper level. The proper level is indicated by the band 292 disposed on tube 224. When the milk rises to this level with the jar inverted a three-pint sample has been withdrawn. The push button 230 is then released and the jar inverted to its normal position and placed in the heating blanket 196. While in the short heating cycle, the pump 222 is rotated to a second marked position in which valve 270 aligns with the semicircular port 284 and at the same time clamp 210 is released and a Lintine filter placed between housing 202 and filter holder 206. Thereafter clamp 210 is repositioned, the bottle is again inverted at the end of the heating cycle, and push button 230 depressed to open valve 226. Actuation of piston rod 248 now applies air under superatmospheric pressure through valve 270 and passageway 288 to jar 172 and exhausts the slightly warm milk through the filter to complete the sediment test.

The pressures and temperatures referred to herein are merely exemplary. It has been found through experience that certain characteristics of the milk such as butterfat content control to some degree the exact pressure and temperature for optimum operation.

However, it is an important purpose of this invention to provide a method and apparatus for greatly facilitating sediment testing through an isolated path without contamination or detrimental effect upon the milk sample. To insure this mode of operation temperatures up to about 70° F. may be employed without any perceptible increase in bacterial action or rancidity. At the upper end of the temperature range pressures as low as 10 p.s.i. have proven sufficient to pass milk of usual butterfat content through the filter while raising the milk temperature in the order of 10° F. from the refrigerated level will permit the milk to be forced through the filter at increased pressures up to about 30 p.s.i. The use of colder milk and greater pressures may destroy the effectiveness of the invention in that butterfat tends to close the pores of the filter and the filter may be ruptured.

While two particular embodiments of this invention have been described in detail hereinabove, it will be apparent that various modifications may be made without departing from the spirit and scope of this invention. For example, it is within the contemplation of this invention that the coordinated use of heat and pressure to pass a relatively large measured quantity of milk through a small filter may be employed either with the receptacle and float switch and the marked receptacle described above or with a timing mechanism or flow meter which will automatically meter a predetermined volume of milk and immediately discharge the tested milk into the original vessel.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. Apparatus for determining the amount of sediment in a vessel of cold milk comprising means defining a continuous fluid path between a region within said vessel and a receptacle, said means including rigid conduit means for insertion in said vessel, flexible conduit means in fluid communication therewith, an elongated cylindrical heating means in communication with said flexible conduit means, outlet means in fluid communication with said heating means, filter means transversely disposed in said continuous path intermediate said heating means and said outlet means, and fluid pumping means in said path intermediate said flexible conduit means and said outlet means, said filter means including a porous filter transversely disposed in said path and having interstices which pass moderately heated milk while entrapping sediment.

2. Apparatus for determining the amount of sediment in a vessel of cold milk comprising means defining a continuous fluid path between a region within said vessel and a receptacle, said means includind rigid conduit means for insertion in said vessel, flexible conduit means in fluid communication therewith, fluid pumping means in said path for drawing fluid into said rigid conduit means, an elongate cylindrical heating means in communication with said flexible conduit means, outlet means in fluid communication with said heating means and said receptacle, filter means transversely disposed in said continuous path intermediate said heating means and said outlet means, and means controlling said fluid pumping means to provide for the passage of a predetermined quantity of milk through said path, said filter means including a porous filter transversely disposed in said path and having interstices which pass moderately heated milk while entrapping sediment.

3. Apparatus for determining the amount of sediment in a vessel of cold milk comprising means defining a continuous fluid path between a region within said vessel and a receptacle, said means including rigid conduit means for insertion in said vessel, flexible conduit means in fluid communication therewith, fluid pumping means in said path for drawing fluid into said rigid conduit means, an elongate cylindrical heating means in communication with said flexible conduit means, outlet means in fluid communication with said heating means and said receptacle, filter means transversely disposed in said continuous path intermediate said heating means and said outlet means, and means controlling said fluid pumping means to provide for the passage of a predetermined quantity of milk through said path, said filter means including a porous filter transversely disposed in said path and having interstices which pass moderately heated milk while entrapping sediment, said heating means having the thermal capacity to raise the temperature of the milk passing therethrough only to a temperature at which the milk will freely pass through said porous filter.

4. Apparatus for determining the amount of sediment in a vessel of cold milk comprising means defining a continuous fluid path between a region within said vessel and a receptacle, said means including rigid conduit means for insertion in said vessel, flexible conduit means in fluid communication therewith, fluid pumping means in said path for drawing fluid into said rigid conduit means, an elongate cylindrical heating means in communication with said flexible conduit means, outlet means in fluid communication with said heating means and said receptacle, filter means transversely disposed in said continuous path intermediate said heating means and said outlet means, and means controlling said fluid pumping means to provide for the passage of a predetermined quantity of milk through said path, said filter means including a porous filter transversely disposed in said path and having interstices which pass moderately heated milk while entrapping sediment, said heating means and said pumping means having capacities such that the moderately heated milk will pass through said porous filter.

5. Apparatus for determining the amount of sediment in a vessel of cold milk comprising means defining a continuous fluid path between a region within said vessel and a receptacle, said means including rigid conduit means for insertion in said vessel, flexible conduit means in fluid communication therewith, fluid pumping means in said path for drawing fluid into said rigid conduit means, an elongate cylindrical heating means in communication with said flexible conduit means, outlet means in fluid communication with said heating means and said receptacle, filter means transversely disposed in said continuous path intermediate said heating means and said outlet means, and means controlling said fluid pumping means to provide for the passage of a predetermined quantity of milk through said path, said filter means including a porous filter transversely disposed in said path and having interstices which pass moderately heated milk while entrapping sediment, said heating means having the thermal capacity to raise the temperature of the milk passing therethrough approximately ten degrees, said pump having sufficient capacity to pass one gallon of moderately heated milk through said porous filter in approximately one to three minutes.

6. Apparatus for determining the amount of sediment in a vessel of cold milk comprising means defining a continuous fluid path between a region within said vessel and a receptacle, said means including rigid conduit means for insertion in said vessel, flexible conduit means in fluid communication therewith, fluid pumping means in said path for drawing fluid into said rigid conduit means, an elongate cylindrical heating means in communication with said flexible conduit means, outlet means in fluid communication with said heating means and said receptacle, filter means transversely disposed in said continuous path intermediate said heating means and said outlet means, and means controlling said fluid pumping means to provide for the passage of a predetermined quantity of milk through said path, the control means comprising a float controlled switch to sense the level of milk in said receptacle and in turn control said fluid pumping means, said filter means including a porous filter transversely disposed in said path and having interstices which pass moderately heated milk while entrapping sediment, said heating means having the thermal capacity to raise the temperature of the milk passing therethrough approximately ten degrees, said pump having sufficient capacity to pass one gallon of moderately heated milk through said porous filter in approximately one to three minutes.

7. Apparatus for determining the amount of sediment in a vessel of cold milk comprising an elongate frame member, fluid pump means mounted on said frame member and defining a fluid inlet and a fluid outlet, an elongate cylindrical heating element mounted on said frame and having one end in communication with said outlet, filter means secured to the other end of said heating means and including a removable filter disposed transversely therein, a flexible conduit extending from the inlet of said pump means, and a rigid conduit of predetermined length terminating said flexible conduits and adapted for insertion in the vessel, a continuous fluid path being defined from an open end of said rigid conduit, through said rigid conduit, said flexible conduit, said pump means, said heating means and said filter means.

8. Apparatus for determining the amount of sediment in a vessel of cold milk comprising an elongate frame member, fluid pump means mounted on said frame member and defining a fluid inlet and a fluid outlet, an elongate cylindrical heating element mounted on said frame and having one end in communication with said outlet, filter means secured to the other end of said heating means and including a removable filter disposed transversely therein, a flexible conduit extending from the inlet of said pump means, a rigid conduit of predetermined length terminating said flexible conduit and adapted for insertion in the vessel, a continuous fluid path being defined from an open end of said rigid conduit, through said rigid conduit, said flexible conduit, said pump means, said heating means and said filter means, and a milk receptacle supported by said frame and positioned to receive milk discharged from said filter means.

9. Apparatus for determining the amount of sediment in a vessel of cold milk comprising an elongate frame member, fluid pump means mounted on said frame member and defining a fluid inlet and a fluid outlet, an elongate cylindrical heating element mounted on said frame and having one end in communication with said outlet, filter means secured to the other end of said heating means and including a removable filter disposed transversely therein, a flexible conduit extending from the inlet of said pump means, a rigid conduit of predetermined length terminating said flexible conduit and adapted for insertion in the vessel, a continuous fluid path being defined from an open end of said rigid conduit, through said rigid conduit, said flexible conduit, said pump means, said heating means and said filter means, a milk receptacle supported by said frame and positioned to receive milk discharged from said filter means, and control means comprising a float switch disposed in operative association with said receptacle to control said pump in response to the fluid level in said receptacle.

10. Apparatus for determining the amount of sediment in a vessel of cold milk comprising an elongate frame member, fluid pump means mounted on said frame member and defining a fluid inlet and a fluid outlet, an elongate cylindrical heating element mounted on said frame and having one end in communication with said outlet, filter means secured to the other end of said heating means and including a removable filter disposed transversely therein, a flexible conduit extending from the inlet of said pump means, a rigid conduit of predetermined length terminating said flexible conduit and adapted for insertion in the vessel, an elongate sheath supported by said frame to receive said rigid conduit when said rigid conduit is not in use in the vessel, a continuous fluid path being defined from an open end of said rigid conduit, through said rigid conduit, said flexible conduit, said pump means, said heating means and said filter means, a milk receptacle supported by said frame and positioned to receive milk discharged from said filter means, and control means comprising a float switch disposed in operative association with said receptacle to control said pump in response to the fluid level in said receptacle.

11. Apparatus for determining the amount of sediment in a vessel of cold milk comprising an elongate frame member, fluid pump means mounted on said frame member and defining a fluid inlet and a fluid outlet, said pump means having a capacity in the order of one gallon per minute, an elongate cylindrical heating element mounted on said frame and having one end in communication with said outlet, said heating means having a capacity to increase the temperature of milk passing therethrough in the order of 10° F., filter means secured to the other end of said heating means and including a removable filter disposed transversely therein, a flexible conduit extending from the inlet of said pump means, a rigid conduit of predetermined length terminating said flexible conduit and adapted for insertion in the vessel, a continuous fluid path being defined from an open end of said rigid conduit, through said rigid conduit, said flexible conduit, said pump means, said heating means and said filter means, a milk receptacle supported by said frame and positioned to receive milk discharged from said filter means, and control means comprising a float switch disposed in operative association with said receptacle to control said pump in response to the fluid level in said receptacle.

12. Apparatus for determining the amount of sediment in a vessel of cold milk comprising an elongate frame member, fluid pump means mounted on said frame member and defining a fluid inlet and a fluid outlet, said pump means having a capacity in the order of one gallon per minute, an elongate cylindrical heating element mounted on said frame and having one end in communication with said outlet, said heating means having a capacity to increase the temperature of milk passing therethrough in the order of 10° F., said heating means having temperature controlling means associated therewith to prevent overheating whenever the flow of milk therethrough is interrupted, filter means secured to the other end of said heating means and including a removable filter disposed transversely therein, a flexible conduit extending from the inlet of said pump means, a rigid conduit of predetermined length terminating said flexible conduit and adapted for insertion in the vessel, a continuous fluid path being defined from an open end of said rigid conduit, through said rigid conduit, said flexible conduit, said pump means, said heating means and said filter means, a milk receptacle supported by said frame and positioned to receive milk discharged from said filter means, and control means comprising a float switch disposed in operative association with said receptacle to control said pump in response to the fluid level in said receptacle.

13. Apparatus for determining the amount of sediment in a vessel of cold milk comprising an elongate frame member, fluid pump means mounted on said frame member and defining a fluid inlet and a fluid outlet, said pump means having a capacity in the order of one gallon per minute and thirty pounds per square inch pressure, an elongate cylindrical heating element mounted on said frame and having one end in communication with said outlet, said heating element having a capacity to increase the temperature of milk passing therethrough in the order of 10° F., said heating element having temperature controlling means associated therewith to prevent overheating whenever the flow of milk therethrough is interrupted, filter means secured to the other end of said heating element and including a removable filter disposed transversely therein, a flexible conduit extending from the inlet of said pump means, a rigid conduit of predetermined length terminating said flexible conduit and adapted for insertion in the vessel, a continuous fluid path being defined from an open end of said rigid conduit, through said rigid conduit, said flexible conduit, said pump element, said heating means and said filter means, a milk receptacle supported by said frame and positioned to receive milk discharged from said filter means, and control means comprising a float switch disposed in operative association with said receptacle to control said pump in response to the fluid level in said receptacle.

14. A method for determining the amount of sediment in a vessel of unadulterated cold milk comprising the steps of withdrawing a measured quantity of milk from said vessel, raising the temperature of said milk in the order of 10° F. by the external application of heat thereto while maintaining said milk in its initial unadulterated state, and passing said heated milk through a filter of known density and area under pressure in the order of thirty pounds per square inch.

15. A method for determining the amount of sediment in a vessel of unadulterated cold milk comprising the steps of withdrawing a measured quantity of milk from said vessel, rapidly raising the temperature of portions of said milk in the order of 10° F. by the external application of heat thereto while maintaining said milk in its initial unadulterated state, and passing said portions of heated milk through a filter of known density and area under pressure in the order of thirty pounds per square inch until said entire measured quantity has been passed therethrough.

16. A method for determining the amount of sediment in a vessel of unadulterated cold milk comprising the steps of withdrawing a measured quantity of milk from said vessel, rapidly raising the temperature of the quantity of milk to a temperature less than about 70° F. by the external application of heat thereto while maintaining said milk in its initial unadulterated state, and passing said portions of heated milk through a filter of known density and area under pressure in excess of about ten pounds per square inch until said entire measured quantity has been passed therethrough.

17. Apparatus for determining the amount of sediment in a vessel of cold milk comprising a rigid conduit for insertion in such vessel, flexible conduit means connected to said rigid conduit and in fluid communication through said rigid conduit with said vessel, a heating chamber in fluid communication with said flexible conduit means, heating means surrounding said heating chamber for raising the temperature of the cold milk which is transferred thereto from said vessel through said rigid conduit and said flexible conduit means, pump means forcing said milk from said vessel through said rigid conduit and said flexible conduit means and into said heating chamber, a filter holder connected to said heating chamber and in fluid communication therewith, and removable filter means disposed in said holder when milk is present in said chamber whereby heated milk flowing from said heating chamber passes therethrough, said pump means being effective to force said heated milk from said heating chamber through said filter means.

18. Apparatus for determining the amount of sediment in a vessel of cold milk comprising a heating chamber, means defining a continuous fluid path between a region within said vessel and said chamber, said means including rigid conduit means for insertion in said vessel and flexible conduit means connected to said rigid conduit means and in fluid communication with said vessel through said rigid conduit means, heating means for raising the temperature of the cold milk within said chamber, a filter holder connected in said fluid path adjacent said heating chamber filter means inserted in said filter holder in said continuous fluid path when milk is present in said chamber whereby the milk which has been heated in said chamber is passed therethrough, and fluid pumping means for transferring said cold milk from said vessel to said chamber and for emptying said chamber through said filter means, said filter means including a porous filter transversely placed in said fluid path and having interstices which pass moderately heated milk while entrapping sediment.

19. Apparatus for determining the amount of sediment in a vessel of cold milk comprising a heating chamber, means defining a continuous fluid path between a region within said vessel and said chamber, heating means for raising the temperature of the cold milk within said chamber, a filter holder connected in said fluid path adjacent said heating chamber, filter means inserted in said holder in said continuous fluid path when milk is present in said chamber whereby the milk which has been heated in said chamber is passed therethrough, and fluid pumping means for transferring said cold milk from said vessel to said chamber and for emptying said chamber through said filter means, said fluid pumping means comprising means for creating a partial vacuum within said chamber to draw said milk therein, means for creating a partial pressure in said chamber to expel said milk through said filter means, and means for selecting between the vacuum means and the pressure means, said filter means including a porous filter transversely placed in said fluid path and having interstices which pass moderately heated milk while entrapping sediment.

20. Apparatus for determining the amount of sediment in a vessel of cold milk comprising a heating chamber, means defining a continuous fluid path between a region within said vessel and said chamber, heating means for raising the temperature of the cold milk within said chamber, a filter holder connected in said fluid path adjacent said heating chamber, filter means inserted in said holder in said continuous fluid path when milk is present in said chamber whereby the milk which has been heated in said chamber is passed therethrough, and fluid pumping means for transferring said cold milk from said vessel to said chamber and for emptying said chamber through said filter means, said fluid pumping means comprising milk inlet means disposed adjacent the bottom of said chamber and in said fluid path, air inlet means communicating with an upper portion of said chamber, piston and cylinder means for alternately creating subatmospheric and superatmospheric pressure within said cylinder, and valve means communicating between said air inlet means and said cylinder, said valve means being adjustable to selectively pass air in the presence of either said subatmospheric or superatmospheric pressures, said filter means including a porous filter transversely placed in said fluid path and having interstices which pass moderately heated milk while entrapping sediment.

References Cited in the file of this patent

UNITED STATES PATENTS

| | | |
|---|---|---|
| 2,119,501 | Baumann | May 31, 1938 |
| 2,177,060 | Drew | Oct. 24, 1939 |